(12) United States Patent
Borgards et al.

(10) Patent No.: US 10,097,553 B2
(45) Date of Patent: Oct. 9, 2018

(54) INSTALLATION OF A SECURE-ELEMENT-RELATED SERVICE APPLICATION IN A SECURE ELEMENT IN A COMMUNICATION DEVICE, SYSTEM AND TELECOMMUNICATIONS

(71) Applicant: Deutsche Telekom AG, Bonn (DE)

(72) Inventors: Frank Borgards, Siegburg (DE); Michael Dupre, St. Augustin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 217 days.

(21) Appl. No.: 15/175,088

(22) Filed: Jun. 7, 2016

(65) Prior Publication Data

US 2016/0366137 A1 Dec. 15, 2016

(30) Foreign Application Priority Data

Jun. 9, 2015 (EP) ..................... 15171243

(51) Int. Cl.
| | |
|---|---|
| *H04L 29/06* | (2006.01) |
| *H04W 4/50* | (2018.01) |
| *H04W 12/08* | (2009.01) |
| *H04L 29/08* | (2006.01) |
| *H04W 12/04* | (2009.01) |

(52) U.S. Cl.
CPC .......... *H04L 63/10* (2013.01); *H04L 63/0428* (2013.01); *H04L 63/08* (2013.01); *H04L 67/34* (2013.01); *H04W 4/50* (2018.02); *H04W 12/08* (2013.01); *H04W 12/04* (2013.01)

(58) Field of Classification Search
CPC ..... H04L 63/10; H04L 63/0428; H04L 63/08; H04L 67/34; H04W 4/50; H04W 4/001; H04W 12/08; H04W 12/04
See application file for complete search history.

(56) References Cited

U.S. PATENT DOCUMENTS

| | | | |
|---|---|---|---|
| 8,429,409 B1 * | 4/2013 | Wall ...................... | H04W 12/04 713/172 |
| 2012/0047237 A1 * | 2/2012 | Arvidsson .............. | G06Q 20/32 709/219 |
| 2012/0171992 A1 | 7/2012 | Cheong et al. | |
| 2012/0300932 A1 | 11/2012 | Cambridge et al. | |

(Continued)

FOREIGN PATENT DOCUMENTS

| | | |
|---|---|---|
| EP | 2388968 A1 | 11/2011 |
| WO | WO 2012091351 A2 | 7/2012 |

*Primary Examiner* — Techane Gergiso
(74) *Attorney, Agent, or Firm* — Leydig, Voit & Mayer, Ltd.

(57) ABSTRACT

A method for installation of a secure-element-related service application in a secure element of a user equipment (UE) associated with a subscriber of a telecommunications network includes: transmitting an initial request, transmitting a request to install, receiving token information, transmitting the token information, transmitting an access and/or installation request together with the token information, and establishing a communication link. The secure-element-related service application, when installed within the secure element, is configured to allow the first server entity, together with a UE-related application installed on the user equipment, to provide a service to the subscriber of the telecommunications network.

11 Claims, 1 Drawing Sheet

(56) References Cited

U.S. PATENT DOCUMENTS

| | | | | |
|---|---|---|---|---|
| 2012/0303961 A1* | 11/2012 | Kean | .................... | H04L 9/3234 |
| | | | | 713/171 |
| 2013/0139230 A1* | 5/2013 | Koh | ........................ | G06F 21/44 |
| | | | | 726/5 |
| 2013/0212384 A1* | 8/2013 | Pelly | ........................ | H04L 9/083 |
| | | | | 713/164 |
| 2013/0227646 A1* | 8/2013 | Haggerty | ............ | H04L 63/0853 |
| | | | | 726/3 |
| 2014/0006194 A1* | 1/2014 | Xie | .................... | G06Q 20/3278 |
| | | | | 705/21 |
| 2014/0031024 A1* | 1/2014 | Xie | ........................ | G06F 21/57 |
| | | | | 455/418 |
| 2014/0101042 A1* | 4/2014 | Grissom | .............. | G06Q 20/027 |
| | | | | 705/41 |
| 2015/0087427 A1* | 3/2015 | Wane | .................... | A63F 13/213 |
| | | | | 463/43 |
| 2015/0193224 A1* | 7/2015 | Ziat | ........................ | G06F 8/65 |
| | | | | 717/172 |
| 2015/0242851 A1* | 8/2015 | Wall | ...................... | H04W 12/04 |
| | | | | 705/71 |
| 2015/0348025 A1* | 12/2015 | Brown | ............... | G06Q 20/3821 |
| | | | | 705/41 |

* cited by examiner

US 10,097,553 B2

INSTALLATION OF A SECURE-ELEMENT-RELATED SERVICE APPLICATION IN A SECURE ELEMENT IN A COMMUNICATION DEVICE, SYSTEM AND TELECOMMUNICATIONS

CROSS-REFERENCE TO RELATED APPLICATIONS

Priority is claimed to European Patent Application No. EP15171243.7, filed on Jun. 9, 2015, the entire disclosure of which is hereby incorporated by reference herein.

FIELD

The present invention relates to a method for an improved installation of a secure-element-related service application in a secure element being located in a communication device, the communication device being associated to a subscriber of a telecommunications network and being a user equipment, wherein the secure-element-related service application, installed within the secure element, allows a first server entity of a service provider, together with a UE-related application installed on the communication device, to provide a service to the subscriber of the telecommunications network.

The present invention further relates to a system for an improved installation of a secure-element-related service application in a secure element being located in a communication device, the communication device being associated to a subscriber of a telecommunications network and being a user equipment, wherein the system comprises the telecommunications network, a first server entity of a service provider, a second server entity being a server entity related to a secure element issuer related to the secure element, and the communication device, wherein the secure-element-related service application, installed within the secure element, allows the first server entity, together with a UE-related application installed on the communication device, to provide a service to the subscriber of the telecommunications network.

The present invention additionally further relates to a telecommunications network for an improved installation of a secure-element-related service application in a secure element being located in a communication device, the communication device being associated to a subscriber of a telecommunications network and being a user equipment, wherein the telecommunications network is connected to a first server entity of a service provider, and to a second server entity being a server entity related to a secure element issuer related to the secure element, wherein the secure-element-related service application, installed within the secure element, allows the first server entity, together with a UE-related application installed on the communication device, to provide a service to the subscriber of the telecommunications network.

Furthermore, the present invention relates to a program and to a computer program product for an improved installation of a secure-element-related service application in a secure element being located in a communication device, according to the inventive method, system and mobile communication network.

BACKGROUND

The uses and capabilities of mobile communication devices have rapidly increased in recent years. For example, mobile communication device users now have the capability to make payments using their mobile phone. While mobile payments provide a convenient tool for a consumer, mobile payments may also present security concerns. Sensitive information, such as a consumer's personal information, account information, etc., can be prone to interception. Additionally, if the mobile communication device is lost or stolen, such information can be used by an unauthorized user. Furthermore, as mobile payment applications evolve, there is a need not only to protect information sent from the mobile communication device, but also to protect information sent to the mobile communication device during transmission.

In current mobile transaction environments, a financial institution (such as a bank) related to a payment device typically has its own trusted service manager (TSM) in order to communicate with a secure element (SE) for provisioning an account associated with the payment device on a mobile communication device. The secure element allows the mobile communication device, e.g., to communicate with a near-field communication (NFC) reader being located at merchant locations for conducting contactless transactions.

Conventionally, a consumer or client wishing to provision an account on a mobile communication device needs to have his/her identity verified by the issuer of the account. Thus, the consumer or client contacts the issuer to provide personal information, e. g. a primary account number, a card expiration date, as well as personal identification information such as name, date of birth, etc. Once the issuer verifies that the consumer or client is the approved user of the account, the issuer would send/give an account activation code to the user. The user then provides the account activation code to a payment processing network for provisioning the account on the mobile communication device. The payment processing network contacts the issuer to confirm the account activation code and that the user is already authorized by the issuer. This process is inefficient as it involves unnecessary communication between the payment processing network and the issuer during the provisioning of the account on the mobile communication device.

Hence, it is generally known to use a sequential process in a push-driven model for the provisioning of services in a secure element such as the UICC: The customer orders the service from the service provider. Then the service provider checks the request, sets up the service and orders a trusted service manager to personalize and encrypt the data and manage the installation steps towards the mobile network operator. The mobile network operator checks it and sends the data via the mobile network, e.g. using the BIP (Bearer Independent Protocol)/CAT-TP protocol (Card Application Toolkit Transfer Protocol) to the UICC.

A limitation of this approach is the separation of the order process for a service and the installation of it. The customer often gets no feedback about the success of the installation. Only in the wallet app the customer can see if the installation was successful. Also the BIP/CAT-TP protocol is less stable than a mobile internet connection.

SUMMARY

In an embodiment, the invention provides a method for installation of a secure-element-related service application in a secure element of a user equipment (UE) associated with a subscriber of a telecommunications network, wherein the secure element corresponds to a secure element issuer. The method includes: in a first step, transmitting an initial request, via a request message, from a UE-related service application of the user equipment towards a first server entity to request installation of the secure-element-related service application in the secure element, wherein the first server entity corresponds to a service provider; in a second step, subsequent to the first step, transmitting, by the first server entity, a request to install the secure-element-related service application to a second server entity, and receiving, by the first entity, token information related to the request to install the secure-element-related service application from the second server entity, wherein the second server entity relates to the secure element issuer; in a third step, subsequent to the second step, transmitting, by the first server entity, the token information to the UE-related service application of the user equipment; in a fourth step, subsequent to the third step, transmitting, by the UE-related service application of the user equipment, an access and/or installation request, together with the token information, to a proxy application of the secure element issuer, the proxy application being configured to access the secure element and/or to install secure-element-related applications on the secure element, wherein the proxy application is further configured to interact with the secure element and is installed in the user equipment as a link between the second server entity and the secure element; and in a fifth step, subsequent to the fourth step, establishing a communication link between the proxy application and the second server entity for transmission of the token information, together with Secure Element Identifier (SEID) information of the user equipment to the second server entity for validation by the second server entity. During the fifth step, the token information is assigned to the SEID information. The secure-element-related service application, when installed within the secure element, is configured to allow the first server entity, together with the UE-related application installed on the user equipment, to provide a service to the subscriber of the telecommunications network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
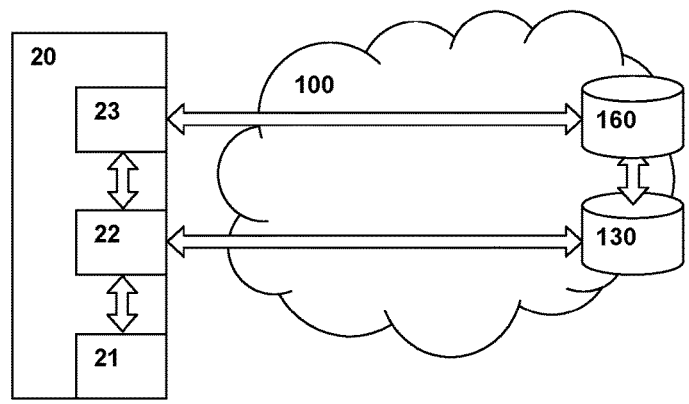
FIG. 1 schematically illustrates a communication device having a secure element, as well as a telecommunications network comprising or being connected to first and second server entities.

In an embodiment, the present invention provides a technically simple, effective and especially cost effective solution for integrating, on the one hand, the order process for a secure-element-related service, and, on the other hand, the installation thereof in relation to a secure element located in a communication device. In a further embodiment, the present invention provides a system comprising the telecommunications network, a first server entity of a service provider, and a second server entity being a server entity related to a secure element issuer related to the secure element, which system allows for a cost effective and comparably simple solution for integrating the order process for a secure-element-related service, and the installation thereof in relation to the secure element.

In an embodiment, the present invention provides a method for an improved installation of a secure-element-related service application in a secure element being located in a communication device, the communication device being associated to a subscriber of a telecommunications network and being a user equipment, wherein the secure-element-related service application, installed within the secure element, allows a first server entity of a service provider, together with a UE-related application installed on the communication device, to provide a service to the subscriber of the telecommunications network, wherein a secure element issuer corresponds to the secure element, wherein the method comprises the following steps:

in a first step, an initial request is transmitted by the UE-related service application of the communication device towards the first server entity to request installation of the secure-element-related service application in the secure element, the initial request being transmitted via a request message, in a second step, subsequent to the first step, the request to install the secure-element-related service application is transmitted, by the first server entity, to the second server entity, the second server entity generating the token information related to the request to install the secure-element-related service application in the secure element of the communication device, and the second server entity transmitting the token information to the first server entity related to the request to install the secure-element-related service application in the secure element, in a third step, subsequent to the second step, the token information is transmitted, by the first server entity to the UE-related service application of the communication device, in a fourth step, subsequent to the third step, an access and/or installation request, related to the secure-element-related service application, is transmitted, together with the token information, by the UE-related service application of the communication device to a proxy application of the secure element issuer, the proxy application being able to access the secure element and/or to install secure-element-related applications on the secure element, wherein the proxy application is able to interact with the secure element of the communication device and is installed in the communication device as a link between, on the one hand, a second server entity of the secure element issuer, and, on the other hand, the secure element of the communication device, the second server entity being a server entity related to the secure element issuer, in a fifth step, subsequent to the fourth step, a communication link is established between the proxy application and the second server entity such that the token information, together with a SEID information (Secure Element Identifier information) of the communication device is transmitted to the second server entity in order to be validated by the second server entity, wherein only during the fifth step, the token information is assigned to the SEID information.

According to the present invention, it is advantageously possible to provide a model for an improved installation of a secure-element-related service application in a secure element being located in a communication device of a subscriber, giving the service provider (e.g. a bank or other service providers of a secure-element-related service application) more control and improved stability by using a mobile IP (Internet Protocol) data connection. Additionally, the service provider is offered an option to control the installation from the application that is installed on the communication device of the subscriber, i.e. from the UE-related service application (that is typically provided by the service provider). Instead of a sequential installation via secured links (i.e. VPN), according to the present invention, an app-based cyclic provisioning sequence is used where the authorization is managed by a token or a token information. According to the present invention via a proxy-function (or a proxy application), the installation in the secure element is controlled.

According to the present invention, a communication link in the form of an Internet Protocol connectivity is established between the communication device, on the one hand, and the first server entity of the service provider, on the other hand. The communication link might use a mobile communication network or another communication network, e.g. a fixed line telecommunications network with the communication device being connected via WLAN, Bluetooth or another radio technology to an access point.

According to the present invention, the installation of a secure-element-related service application in a secure element can be facilitated by using the token or the token information. The token (or token information) represents the combined authorization from the secure element issuer and a service provider to a customer (or subscriber) to request service installation, i.e. the installation of the secure-element-related service application. Thereby, it is advantageously possible according to the present invention that new possibilities for installation processes are opened up, i.e. a support for installation processes that feature a more user centric approach in the form of using applications (apps) on communication devices (e.g., mobile devices). It is of important (regarding security level and regarding acceptance) that embodiments of the present invention are compatible with standard interfaces, like, e.g., the Global Platform interface regarding secure element communication.

According to the present invention, a secure-element-related service application is to be installed in a secure element within a communication device. The communication device is associated to a subscriber of a telecommunications network and is a user equipment. The secure element is typically located in the communication device, typically either
  on a removable hardware card such as a SIM-card (subscriber identity module card), or
  on a non-removable dedicated hardware component of the communication device realizing the secure element and comprising an appropriate software module, or
  on a non-removable general purpose hardware component of the communication device and a software module realizing the secure element.

The secure-element-related service application is normally installed within the secure element, allowing a first server entity of a service provider, together with a UE-related application installed on the communication device, to provide a service to the subscriber of the telecommunications network. Furthermore, the secure element is issued by a secure element issuer, i.e. the secure element issuer corresponds to the secure element.

According to the present invention, in a first step, an initial request is transmitted by the UE-related service application of the communication device towards the first server entity to request installation of the secure-element-related service application in the secure element, the initial request being transmitted via a request message. This means that a customer (e.g., of the mobile network operator, i.e. a subscriber that typically owns the communication device) requests a service (e.g., a payment card) starting from an application (app) (e.g., a banking app). In the context of the present invention, the requested service is also referred to by the term "secure-element-related service application", and the application (app) is also referred to by the term "UE-related application". The customer sends the order for the service (of the secure-element-related service application) to the service provider backend (i.e. the first server entity), possibly after having performed an authentication process involving typically inputting and/or generating user credentials and/or biometric information such as finger print-related data.

In a second step, the request to install the secure-element-related service application is transmitted, by the first server entity, to the second server entity, the second server entity generating the token information related to the request to install the secure-element-related service application in the secure element of the communication device, and the second server entity transmitting the token information to the first server entity related to the request to install the secure-element-related service application in the secure element. This means that the service provider sends the request (e.g., of the requested service of, for example, a payment card) to the secure element issuer (SEI), the secure element issuer being typically the mobile network operator (MNO), possibly involving a trusted service manager (TSM). A possible interface for the communication between the first server entity (i.e. the service provider) and the second server entity (i.e. the secure element issuer, SEI) is GlobalPlatform. This part of the communication is often secured and allows the secure element issuer (SEI) to validate and approve the request (transmitted by the service provider, i.e. the first server entity). The secure element issuer generates a token (or token information), saves it, and sends it back to the service provider (i.e. to the first server).

In a third step, the token information is transmitted, by the first server entity to the UE-related service application of the communication device. This means that the service provider (or first server entity)—after receiving the token or token information from the second server entity—sends the token (or token information) to the application (i.e. the UE-related application, within the communication device) of the customer.

In a fourth step, an access and/or installation request, related to the secure-element -related service application, is transmitted, together with the token information, by the UE-related service application of the communication device to a proxy application of the secure element issuer, the proxy application being able to access the secure element and/or to install secure-element-related applications on the secure element, wherein the proxy application is able to interact with the secure element of the communication device and is installed in the communication device as a link between, on the one hand, a second server entity of the secure element issuer, and, on the other hand, the secure element of the communication device, the second server entity being a server entity related to the secure element issuer. This means that the service provider application (i.e. the UE-related service application) sends an installation request for the service (i.e. the secure-element-related service application) to the proxy-app (or proxy application) of the secure element issuer (SEI)—i.e. integrated into the MNO wallet app—thereby providing the token (or token information) as parameter. The proxy-app provides the link between the SEI backend (or second sever entity) and the secure element, reads the secure element ID (i.e. the SEID (Secure Element Identifier Information) or the ICCID (integrated circuit card identifier)) from the secure element.

In a fifth step, subsequent to the fourth step, a communication link is established between the proxy application and the second server entity such that the token information, together with a SEID information (Secure Element Identifier information) of the communication device (or of the secure element within the communication device) is transmitted to the second server entity in order to be validated by the second server entity. This means that a connection is opened up (from the proxy application) to the SEI backend (i.e. the second sever entity) and the proxy application requests the service installation providing the ICCID/SEID and the token (information).

According to the present invention, the token information is assigned (from the perspective of the secure element issuer, i.e. the second server entity) to the ICCID/SEID information only during the fifth step, i.e. prior to the fifth step (within the inventive method) or prior to the establishment of the communication link between the proxy application and the second server entity (according to the inventive system or telecommunications network), the second server entity is not aware of the assignment of a given (previously generated) token information to a specific subscriber of the mobile network operator.

According to the present invention, it is preferred that during the fifth step, installation commands are received (in case that a validation process (involving the token information), performed within the second server entity, is successfully terminated), from the second server entity, by the proxy application in order to install the secure-element-related service application in the secure element, wherein, preferably, the installation commands, received by the proxy application, are transmitted in encrypted form.

This means that after opening the connection from the proxy application to the SEI backend (i.e. the second sever entity)—or during the fifth step—the SEI (i.e. the second server entity) checks the token (information) for validity. If valid, the SEI (or second server entity) generates the installation commands (typically using APDU, Application Protocol Data Unit, a widely used communication format between the secure element and the off-card applications) and secures them with the ISD keys which can be derived from the secure element ID (i.e. ICCID/SEID). These commands are sent i.e. via the proxy-app to the secure element and are executed there.

Thereby, it is advantageously possible according to the present invention that a high level of security can be combined with an enhanced level of convenience and ease of use for a user of the communication device.

According to the present invention, it is furthermore preferred that the SEI backend (i.e. the second server entity) indicates to the service provider or TSM backend (i.e. the first server entity) the successful execution of the commands (at the communication device). The service provider or TSM (i.e. the first server entity) then typically queries the Secure Element ID (i.e. ICCID) from the secure element issuer (SEI) to derive a secret key. The service provider (i.e. the first server entity) generates a personalization script and typically secures it with the secret key. According to a variant of the present invention, this personalization script is send to the SEI backend (i.e. to the second server entity) and via the proxy application to the secure element of the communication device. According to an alternative variant of the present invention, the script is sent via the service provider app (i.e. the UE-related service application) to the secure element.

Furthermore, it is preferred according to the present invention that the second server entity is part of the telecommunications network.

Furthermore, the present invention relates to a system for an improved installation of a secure-element-related service application in a secure element being located in a communication device, the communication device being associated to a subscriber of a telecommunications network and being a user equipment, wherein the system comprises the telecommunications network, a first server entity of a service provider, a second server entity) being a server entity related to a secure element issuer related to the secure element, and the communication device, wherein the secure-element-related service application, installed within the secure element, allows the first server entity, together with a UE-related application installed on the communication device, to provide a service to the subscriber of the telecommunications network, wherein the system is configured such that:
   an initial request is transmitted by the UE-related service application of the communication device towards the first server entity to request installation of the secure-element-related service application in the secure element, the initial request being transmitted via a request message,
   the request to install the secure-element-related service application is transmitted, by the first server entity, to the second server entity, the second server entity generating the token information related to the request to install the secure-element-related service application in the secure element of the communication device, and the second server entity transmitting the token information to the first server entity related to the request to install the secure-element-related service application in the secure element,
   the token information is transmitted, by the first server entity to the UE-related service application of the communication device,
   an access and/or installation request, related to the secure-element-related service application, is transmitted, together with the token information, by the UE-related service application of the communication device to a proxy application of the secure element issuer, the proxy application being able to access the secure element and/or to install secure-element-related applications on the secure element, wherein the proxy application is able to interact with the secure element of the communication device and is installed in the communication device as a link between, on the one hand, a second server entity of the secure element issuer, and, on the other hand, the secure element of the communication device,
   a communication link is established between the proxy application and the second server entity such that the token information, together with a SEID information (Secure Element Identifier information) of the communication device is transmitted to the second server entity in order to be validated by the second server entity, wherein the token information is assigned to the SEID information upon the establishment of the communication link between the proxy application and the second server entity.

Thereby, it is advantageously possible according to the present invention to provide an improved installation of a secure-element-related service application in a secure element that is located in a communication device of a subscriber.

According to the present invention, it is preferred that the system is configured such that installation commands are received, from the second server entity, by the proxy application in order to install the secure-element-related service application in the secure element, wherein, preferably, the installation commands, received by the proxy application, are transmitted in encrypted form.

All preferred embodiments as mentioned above with regard to the inventive method are also—mutatis mutandis—to be applied to the system.

Additionally, the present invention relates to a telecommunications network for an improved installation of a secure-element-related service application in a secure element being located in a communication device, the communication device being associated to a subscriber of a telecommunications network and being a user equipment, wherein the telecommunications network is connected to a first server entity of a service provider, and to a second server entity) being a server entity related to a secure element issuer related to the secure element, wherein the secure-element-related service application, installed within the secure element, allows the first server entity, together with a UE-related application installed on the communication device, to provide a service to the subscriber of the telecommunications network, wherein the telecommunications network is configured such that:

an initial request is transmitted by the UE-related service application of the communication device towards the first server entity to request installation of the secure-element-related service application in the secure element, the initial request being transmitted via a request message, the request to install the secure-element-related service application is transmitted, by the first server entity, to the second server entity, the second server entity generating the token information related to the request to install the secure-element-related service application in the secure element of the communication device, and the second server entity transmitting the token information to the first server entity related to the request to install the secure-element-related service application in the secure element, the token information is transmitted, by the first server entity to the UE-related service application of the communication device, an access and/or installation request, related to the secure-element-related service application, is transmitted, together with the token information, by the UE-related service application of the communication device to a proxy application of the secure element issuer, the proxy application being able to access the secure element and/or to install secure-element-related applications on the secure element, wherein the proxy application is able to interact with the secure element of the communication device and is installed in the communication device as a link between, on the one hand, a second server entity of the secure element issuer, and, on the other hand, the secure element of the communication device, a communication link is established between the proxy application and the second server entity such that the token information, together with a SEID information (Secure Element Identifier information) of the communication device is transmitted to the second server entity in order to be validated by the second server entity, wherein the token information is assigned to the SEID information upon the establishment of the communication link between the proxy application and the second server entity.

Thereby, it is advantageously possible according to the present invention to provide an improved installation of a secure-element-related service application in a secure element that is located in a communication device of a subscriber.

According to the present invention, it is preferred that the telecommunications network is configured such that installation commands are received, from the second server entity, by the proxy application in order to install the secure-element-related service application in the secure element, wherein, preferably, the installation commands, received by the proxy application, are transmitted in encrypted form.

All preferred embodiments as mentioned above with regard to the inventive method are also—mutatis mutandis—to be applied to the inventive telecommunications network.

Additionally, the present invention relates to a program comprising a computer readable program code which, when executed on a computer or on an application or component of a communication device, e.g., the secure element, or on a network component of a telecommunications network or on a first server entity or on a second server entity or in part on an application or component of a communication device and in part on a network component of a telecommunications network or in part on a first server entity or in part on a second server entity, causes the computer or the application or component of the communication device, e.g., the secure element, or the network component of the telecommunications network or the first server entity or the second server entity to perform the inventive method.

Still additionally, the present invention relates to computer program product for an improved installation of a secure-element-related service application in a secure element being located in a communication device, the computer program product comprising a computer program stored on a storage medium, the computer program comprising program code which, when executed on a computer or on an application or component of a communication device, e.g., the secure element, or on a network component of a telecommunications network or on a first server entity or on a second server entity or in part on an application or component of a communication device and in part on a network component of a telecommunications network or in part on a first server entity or in part on a second server entity, causes the computer or the application or component of the communication device, e.g., the secure element, or the network component of the telecommunications network or the first server entity or the second server entity to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a communication device 20 having a secure element 21, as well as a telecommunications network 100 comprising or being connected to a first server entity 160 and to a second server entity 130 is schematically shown. The communication device 20 can, e.g., be used in (or in connection with) the telecommunications network 100 being a mobile communication network. Furthermore, the telecommunications network 100 can also be realized by a fixed line telecommunications network and the communication device 20 being connected to a network node of such a telecommunications network 100 using a wireline connection or using a wireless connection, e.g. WLAN, Bluetooth or another wireless access technology. In an example, the telecommunications network 100 can be thought of as a mobile communication network, e.g., as a public land mobile network (cellular telecommunications network), comprising typically an access network and a core network. However, for the sake of simplicity, such details are not represented in FIG. 1.

In the exemplary embodiment represented in FIG. 1, the communication device 20 is connected—via the telecommunications network 100—to a first server entity 160. The first server entity 160 typically corresponds to a service provider, and a second server entity 130 being a server entity related to a secure element issuer, related to the secure element 21 within the communication device 20. The first server entity 160 is contacted by the communication device 20 (or by the user of the communication device 20, this user typically being a subscriber of the telecommunications network 100, especially in case that the telecommunications network 100 corresponds to a mobile communication network) in order to obtain a service, which is, according to the present invention, a secure-element-related service, involving a secure-element-related service application.

The communication device 20 is typically any user equipment being able to communicate with the telecommunications network 100/mobile communication network 100 to the first server entity 160. For example, the communication device 20 can also be realized as a machine to machine communication device (machine type communication device).

The secure element 21 typically corresponds to or is integrated in a SIM card/UICC (Universal Integrated Circuit Card) (either a hardware or a soft SIM (card)) located in the communication device 20.

According to the present invention, the communication device 20 comprises—besides the secure element 21—a UE-related service application 23 and a proxy application 22.

Figure 2:
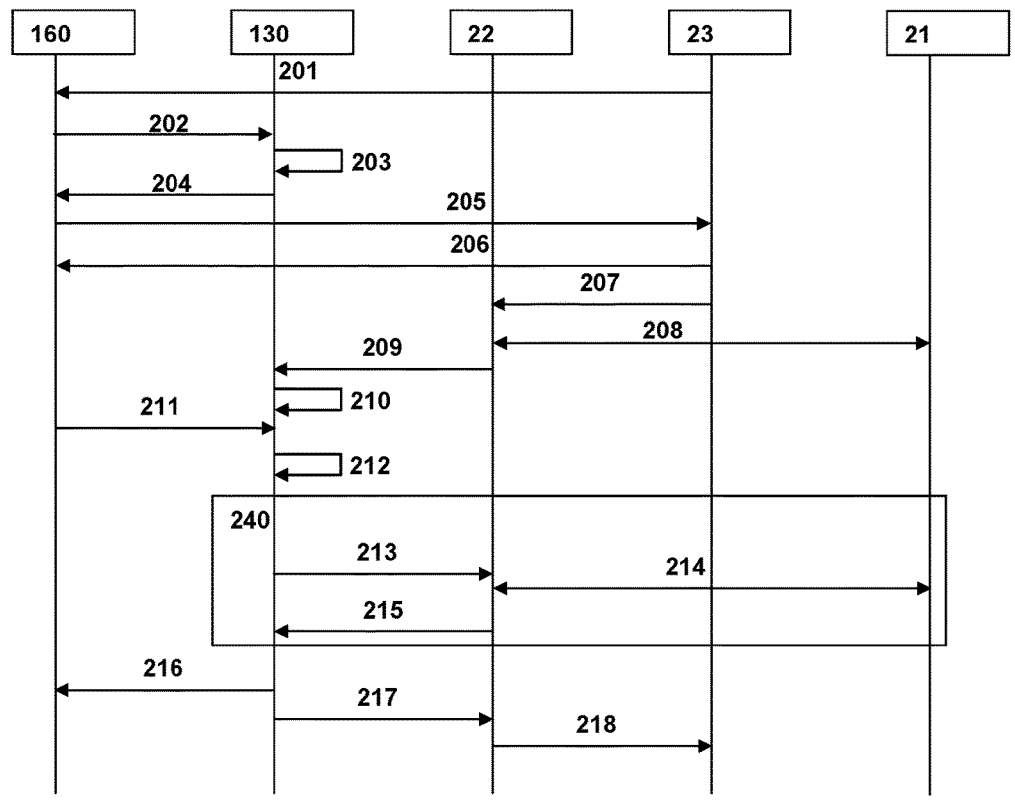
FIG. 2 schematically illustrates a communication diagram between a secure element, a UE-related service application, a proxy application, the first server entity (service provider), and the second server entity (secure element issuer, SEI).

In FIG. 2, a communication diagram between the secure element 21, the UE-related service application 23, the proxy application 22, the first server entity 160 (service provider), and the second server entity 160 (secure element issuer, SEI) is schematically shown.

In a first processing step 201, the UE-related service application 23 (within the communication device 20) sends a request message—also called initial request—to the first server entity 160, thereby requesting the first server entity 160 to initiate to install the secure-element-related service application on the communication device 20. This corresponds to a first step, where the UE-related service application 23 of the communication device 20 transmits the initial request towards the first server entity 160 to request installation of the secure-element-related service application in the secure element 21.

In a second processing step 202, the first server entity 160 sends a message to the second server entity 130, thereby requesting the second server entity 130 to create or generate a new token (or token information). In a third processing step 203, the second server entity 130 creates a token or token information, and stores the token or token information in a database or other memory device. In a fourth processing step 204, the second server entity 130 sends a message to the first server entity 160, thereby transmitting the token information to the first server entity 160. The second, third, and fourth processing step 202, 203, 204 correspond to a second step (the request to install the secure-element-related service application being transmitted to the second server entity 130; the second server entity 130 generating the token information; and the second server entity 130 transmitting the token information to the first server entity first server entity 160).

In a fifth processing step 205, the first server entity 160 sends a message to the UE-related service application 23. This corresponds to a third step, where the token information is transmitted, by the first server entity 160 to the UE-related service application 23 of the communication device 20.

According to a variant of the present invention, in a sixth processing step 206, the UE-related service application 23 sends a message to the first server entity 160, thereby confirming the reception of the token information. Optionally, the sixth processing step 206 is omitted.

In a seventh processing step 207, the UE-related service application 23 sends a message to the proxy application 22. In an eighth processing step 208, the proxy application 22 exchanges information with the secure element 21 in order to read the SEID (secure element Identifier) and/or the ICCID (Integrated circuit card identifier) of the secure element 21. The seventh and eighth processing steps 207, 208 correspond to a fourth step (an access and/or installation request, related to the secure-element-related service application, being transmitted, together with the token information, by the UE-related service application 23 of the communication device 20 to the proxy application 22 of the secure element issuer).

In a ninth processing step 209, the proxy application 22 sends a message to the second server entity 130. In a tenth processing step 210, the second server entity 130 stores the ICCID/SEID to the token information. The ninth and tenth processing steps 209, 210 correspond to a fifth step (a communication link being established between the proxy application 22 and the second server entity 130 such that the token information, together with a SEID information (Secure Element Identifier information) of the communication device 20 being transmitted to the second server entity 130 in order to be validated by the second server entity 130).

According to the present invention, the token information is assigned to the SEID information/ICCID information only during the fifth step—i.e. not prior to the fifth step/not prior to the ninth processing step 209.

According to a variant of the present invention, in an eleventh processing step 211, the first server entity 160 sends a message to the second server entity 130. Optionally, the eleventh processing step 211 is omitted.

In a twelfth processing step 212, the second server entity 130 waits for a request by the first server entity 160 and/or waits for the ICCID information/SEID information.

In a thirteenth processing step 213, the second server entity 130 sends an APDU message (APDU typically referring to "Application Protocol Data Unit" and being the communication format between the secure element 21 and the off-card applications) to the proxy application 22. In a fourteenth processing step 214, the proxy application 22 exchanges information with the secure element 21, and in a fifteenth processing step 215, the proxy application 22 sends a response message to the second server entity 130. The thirteenth, fourteenth, and fifteenth processing steps 213, 214, 215 together are referenced by reference sign 240 and correspond to a loop in the exemplary processing flow of an implementation according to the present invention.

In a sixteenth processing step 216, the second server entity 130 sends a message to the first server entity 160. In a seventeenth processing step 217, the second server entity 130 sends a further message to the proxy application 22, and in an eighteenth processing step 218, the proxy application 22 sends a message to the UE-related service application 23.

According to the present invention, the creation and use of token information is suggested in the installation process of a secure-element-related service application within a secure element 21 of a communication device 20. Thereby, it is advantageously possible to realize a combined authorization for service installation by the service provider (i.e. the first server entity 160) and the second server entity 130, i.e. the secure element issuer: the service provider (i.e. the first server entity 160) checks the customer request and translates the authorization into a token request to the second server entity 130 (secure element issuer). The secure element issuer (second server entity 130) checks whether that request is send from an authorized service provider and optionally checks that the customer (i.e. the user of the communication device 20) is eligible for the requested secure-element-related service (i.e. to use the requested secure-element-related service application). The token information represents the added authorization of the second server entity 130/the secure element issuer). According to the present invention, different applications (apps) communicate with each other using the token information to identify the authorized service request for a particular user (subscriber). According to the present invention, the token information is used as an identifier of the customer for the service provider. According to the present invention, a dynamic retrieval of the identity (information) of the secure element 21 (i.e. the ICCID or the SEID) by the proxy-app 22 as a "delivery address" for the installation is realized. According to the present invention, it is advantageously possible to install an application on the secure element 21/the universal integrated circuit card (UICC) without using the MSISN at all.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for installation of a secure-element-related service application in a secure element of a user equipment (UE) associated with a subscriber of a telecommunications network, wherein the secure element corresponds to a secure element issuer, the method comprising:

in a first step, transmitting an initial request, via a request message from a UE-related service application of the user equipment towards a first server entity, for installation of the secure-element-related service application in the secure element, wherein the first server entity corresponds to a service provider;

in a second step, subsequent to the first step, transmitting, by the first server entity, a request to install the secure-element-related service application to a second server entity corresponding to the secure element issuer, and receiving, by the first server entity from the second server entity, token information generated by the second server entity and representing combined authorization from the secure element issuer and the service provider to request installation of the secure-element-related service application in the secure element;

in a third step, subsequent to the second step, transmitting, by the first server entity, the token information to the UE-related service application of the user equipment;

in a fourth step, subsequent to the third step, transmitting, by the UE-related service application of the user equipment to a proxy application of the secure element issuer, an access and/or installation request together with the token information, wherein the proxy application is configured to access the secure element and/or to install secure-element-related applications on the secure element, and wherein the proxy application is further configured to interact with the secure element and is installed in the user equipment as a link between the second server entity and the secure element; and in a fifth step, subsequent to the fourth step, transmitting, by the proxy application to the second server entity via a communication link established between the proxy application and the second server entity, the token information together with Secure Element Identifier (SEID) information of the user equipment for validation by the second server entity;

wherein, during the fifth step, the token information is assigned to the SEID information; and wherein the secure-element-related service application, when installed within the secure element, is configured to allow the first server entity, together with the UE-related application installed on the user equipment, to provide a service to the subscriber of the telecommunications network.

2. The method according to claim 1, wherein, during the fifth step, installation commands from the second server entity are received by the proxy application for installation of the secure-element-related service application in the secure element.

3. The method according to claim 2, wherein the installation commands received by the proxy application are transmitted in encrypted form.

4. The method according to claim 1, wherein the second server entity is part of the telecommunications network.

5. A system for installation of a secure-element-related service application in a secure element of a user equipment (UE) associated with a subscriber of a telecommunications network, wherein the system comprises:

the telecommunications network;

a first server entity, wherein the first server entity corresponds to a service provider;

a second server entity, wherein the second server entity is related to a secure element issuer related to the secure element; and the user equipment;

wherein the secure-element-related service application, when installed within the secure element, is configured to allow the first server entity, together with a UE-related application installed on the communication device, to provide a service to the subscriber of the telecommunications network;

wherein the UE-related application of the user equipment is configured to transmit, towards the first server entity via a request message, an initial request for installation of the secure-element-related service application in the secure element;

wherein the first server entity is configured to transmit a request to install the secure-element-related service application to the second server entity;

wherein the second server entity is configured to generate token information and to transmit the token information to the first server entity, the token information representing combined authorization from the secure element issuer and the service provider to request installation of the secure-element-related service application in the secure element;

wherein the first server entity is configured to transmit the token information to the UE-related service application of the user equipment;

wherein the UE-related service application of the user equipment is configured to transmit an access and/or installation request related to the secure-element-related service application, together with the token information, to a proxy application of the secure element issuer, the proxy application being configured to access the secure element and/or to install secure-element-related applications on the secure element, wherein the proxy application is configured to interact with the secure element and is installed in the user equipment as a link between the second server entity and the secure element;

wherein the proxy application is configured to transmit, via a communication link established with the second server entity, the token information, together with Secure Element Identifier (SEID) information of the user equipment, to the second server entity for validation by the second server entity, wherein the token information is assigned to the SEID information upon the establishment of the communication link between the proxy application and the second server entity.

6. The system according to claim 5, wherein the second server entity is configured to transmit installation commands to the proxy application for installation of the secure-element-related service application in the secure element.

7. The system according to claim 6, wherein the second server entity is configured to transmit the installation commands in encrypted form.

8. One or more non-transitory, computer-readable mediums having processor-executable instructions stored thereon for installation of a secure-element-related service application in a secure element of a user equipment (UE) associated with a subscriber of a telecommunications network, wherein the secure element corresponds to a secure element issuer, the processor-executable instructions, when executed, facilitating performance of the following steps:

in a first step, transmitting an initial request, via a request message from a UE-related service application of the user equipment towards a first server entity, for installation of the secure-element-related service application in the secure element, wherein the first server entity corresponds to a service provider;

in a second step, subsequent to the first step, transmitting, by the first server entity, a request to install the secure-element-related service application to a second server entity corresponding to the secure element issuer, and receiving, by the first server entity from the second server entity, token information generated by the second server entity and representing combined authorization from the secure element issuer and the service provider to request installation of the secure-element-related service application in the secure element;

in a third step, subsequent to the second step, transmitting, by the first server entity, the token information to the UE-related service application of the user equipment;

in a fourth step, subsequent to the third step, transmitting, by the UE-related service application of the user equipment to a proxy application of the secure element issuer, an access and/or installation request together with the token information, wherein the proxy application is configured to access the secure element and/or to install secure-element-related applications on the secure element, and wherein the proxy application is further configured to interact with the secure element and is installed in the user equipment as a link between the second server entity and the secure element; and in a fifth step, subsequent to the fourth step, transmitting, by the proxy application to the second server entity via a communication link established between the proxy application and the second server entity, the token information together with Secure Element Identifier (SEID) information of the user equipment for validation by the second server entity;

wherein, during the fifth step, the token information is assigned to the SEID information; and wherein the secure-element-related service application, when installed within the secure element, is configured to allow the first server entity, together with the UE-related application installed on the user equipment, to provide a service to the subscriber of the telecommunications network.

9. The non-transitory computer-readable medium according to claim 8, wherein, during the fifth step, installation commands from the second server entity are received by the proxy application for installation of the secure-element-related service application in the secure element.

10. The non-transitory computer-readable medium according to claim 9, wherein the installation commands received by the proxy application are transmitted in encrypted form.

11. The non-transitory computer-readable medium according to claim 8, wherein the second server entity is part of the telecommunications network.

\* \* \* \* \*